(12) United States Patent
Antypas, III

(10) Patent No.: US 8,296,659 B1
(45) Date of Patent: Oct. 23, 2012

(54) METHOD FOR DISTINGUISHING A LIVE ACTOR FROM AN AUTOMATION

(75) Inventor: John Antypas, III, Pittsburg, CA (US)

(73) Assignee: Cellco Partnership, Basking Ridge, NJ (US)

(*) Notice: Subject to any disclaimer, the term of this patent is extended or adjusted under 35 U.S.C. 154(b) by 1289 days.

(21) Appl. No.: 11/987,833

(22) Filed: Dec. 5, 2007

Related U.S. Application Data

(60) Provisional application No. 60/981,318, filed on Oct. 19, 2007.

(51) Int. Cl.
*G06F 3/00* (2006.01)
*G06F 3/01* (2006.01)

(52) U.S. Cl. ......... 715/741; 715/742; 715/743; 715/745

(58) Field of Classification Search .................. 715/741, 715/742, 743, 745
See application file for complete search history.

(56) References Cited

U.S. PATENT DOCUMENTS

| | | | |
|---|---|---|---|
| 7,039,949 B2 | 5/2006 | Cartmell et al. | |
| 7,149,899 B2 | 12/2006 | Pinkas et al. | |
| 7,197,646 B2* | 3/2007 | Fritz et al. ..................... | 713/182 |
| 7,260,474 B1 | 8/2007 | Thayathil et al. | |
| 2005/0066201 A1* | 3/2005 | Goodman et al. ............ | 713/202 |
| 2006/0136219 A1* | 6/2006 | Wang ............................ | 704/273 |
| 2007/0026372 A1* | 2/2007 | Huelsbergen ................. | 434/322 |
| 2007/0174628 A1 | 7/2007 | Charrette, III et al. | |
| 2007/0277224 A1* | 11/2007 | Osborn et al. ..................... | 726/2 |
| 2008/0127302 A1* | 5/2008 | Qvarfordt et al. ................. | 726/2 |
| 2009/0012855 A1* | 1/2009 | Jamal et al. ..................... | 705/14 |
| 2009/0077629 A1* | 3/2009 | Douceur et al. .................. | 726/2 |

OTHER PUBLICATIONS

"Transcription of a Radio Broadcast," Oct. 18, 2007.
Gibson Research Corporation, *"Perfect Paper Passwords,"* available at www.grc.com/sn/SN-115.pdf as of Oct. 25, 2007.
Gibson Research Corporation, *"Roaming Authentication,"* available at www.grc.com/sn/SN-113.pdf as of Oct. 11, 2007.

* cited by examiner

*Primary Examiner* — Nicholas Augustine

(57) ABSTRACT

A computer-implemented method is presented for distinguishing a live actor from an automation. The method includes receiving, from a user, a request to access a service, and, in response presenting to the user a minority set of N objects and a majority set of >N objects that share at least one common attribute expected to be apparent to a human observer absent among objects associated with the minority set. The method also includes requesting, from the user, to identify at least one object, from among the objects associated with the minority or majority set, that satisfies a predetermined criterion and receiving, from the user, an indication of a selection of at least one object. The method further includes determining whether the user-selected object satisfies the predetermined criterion and determining that the user is a human upon determining that the user-selected object satisfies the predetermined criterion.

28 Claims, 8 Drawing Sheets

300B
Which one of these items is not like the others?
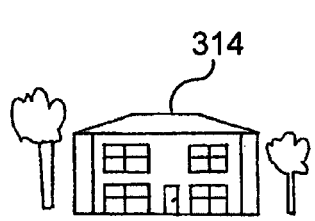   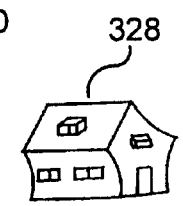
314     316     320     328
ALT-TAG: MANSION     ALT-TAG: HOME     ALT-TAG: HUMAN     ALT-TAG: HOUSE
Fig. 3B

400A

| Images | Alt-Tag | Metadata Tags |
|---|---|---|
| Mansion.img | Mansion | Residence Large Size |
| House.img | House | Residence Medium Size |
| House.img | Home | Residence Small Size |
| Human.img | Human | Person |

| Question | Metadata Tag | User-selected object metadata |
|---|---|---|
| Which one of these things is not like the other? | Person | Person |
| Which one of the following items are similar to each other? | Residence Large Size Residence Medium Size Residence – Small Size | |

500B
| BELOW, YOU SEE PIECES OF EQUIPMENT YOU MAY OR MAY NOT WORK ON AS PART OF YOUR JOB. SELECT ONLY THE PIECES OF EQUIPMENT YOU EXPECT TO WORK WITH |
|---|
  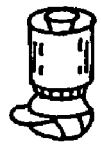
ALT-TAG　　ALT-TAG　　ALT-TAG
WI FI™　　CISCO BOOKS　BLENDER
Fig. 5B

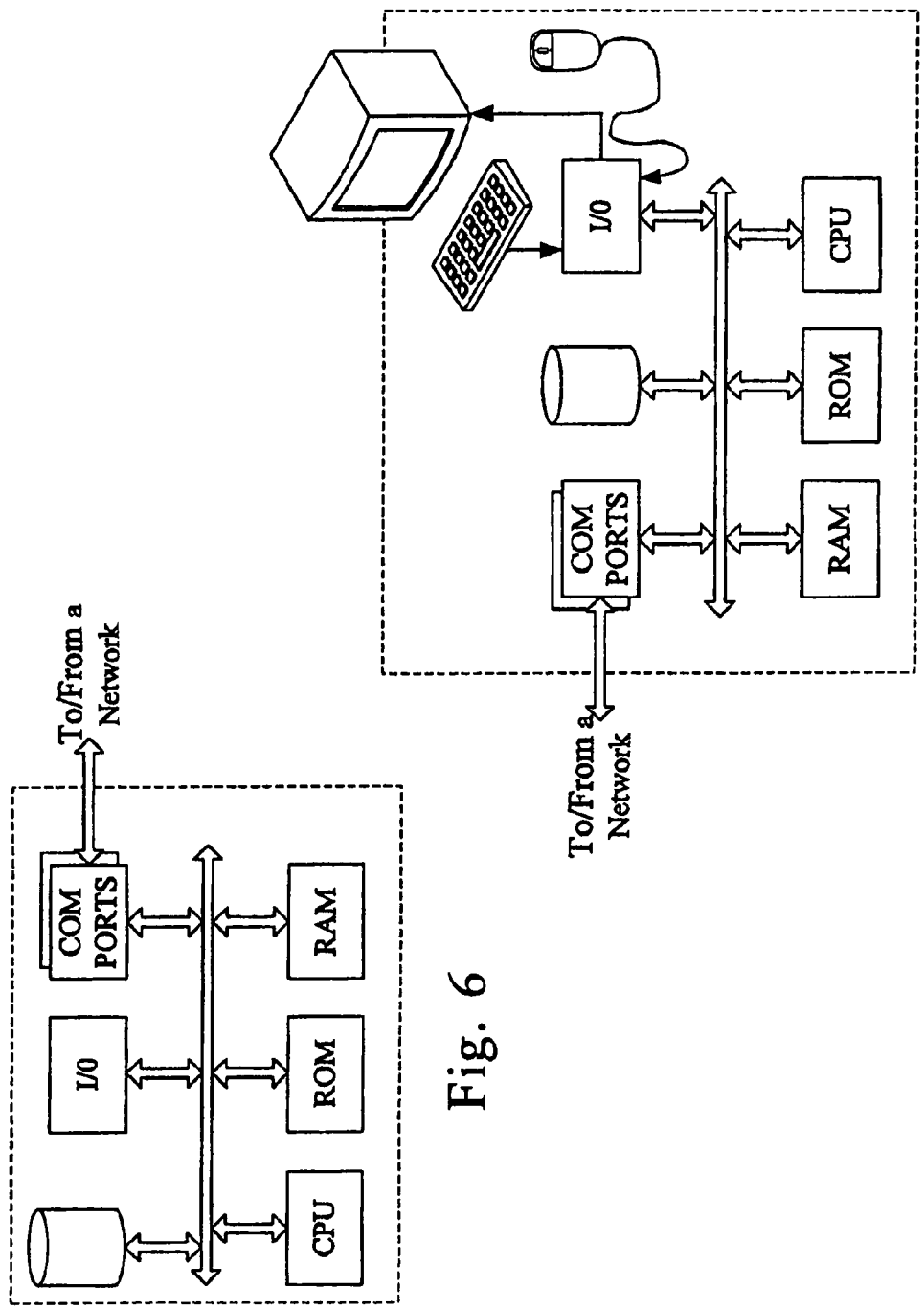

METHOD FOR DISTINGUISHING A LIVE ACTOR FROM AN AUTOMATION

RELATED APPLICATION

This application claims priority to U.S. Patent Application Ser. No. 60/981,318, filed on Oct. 19, 2007 and titled "Method For Distinguishing A Live Actor From An Automation." The entire content of the prior application is incorporated herein by reference.

TECHNICAL FIELD

This disclosure relates to a method for distinguishing a live actor from an automation.

BACKGROUND

Modern computer systems offer a variety of services to remote operators. For some of these services, it may be necessary or advisable that the computer systems be able to ensure that the remote operator requesting such services is, in fact, a human being and not itself an automation, that is to say an automated (e.g., a computer) system. For example, websites that offer free e-mail accounts, or web services that offer items for sale may want to ensure that the remote user accessing their services is indeed a human acting in a deliberate manner and not a machine. For another example, a banking website may wish to confirm that transfer requests from its website were initiated by customers and not automated fraud processes, which could flood the site with unsolicited requests.

One of the techniques by which modern computer systems can achieve such a goal of determining whether a user attempting to access the system is a human or a machine is with use of what is known as a "human interactive proof" ("HIP") or a "reverse Turing test." See e.g., U.S. Patent Application Publication Number 2007/0026372 ("Huelsbergen") at page 1, paragraph [3]. According to Huelsbergen, HIP presents a user with a puzzle that is hard or expensive in time for a machine to solve, whereas a reverse Turing test is a challenge posed by a computer which only a human should be able to solve. Id. Reverse Turing tests have become known as CAPTCHAs (completely automated public Turing test to tell computers and human apart). Huelsbergen at page 1, paragraph [5].

Most typically, these systems work by displaying distorted text images (e.g., an English language word containing a sequence of alphabetic characters) to the remote operator and asking the remote operator to identify the distorted image. Apparently, the distorted text images are sufficiently complex as make computer recognition difficult, yet, these images are sufficiently obvious to make human recognition trivial.

As noted in Huelsbergen prior art CAPTCHAs and HIPs often have the limitation that the challenge posed is either too easy to break (e.g., solve) by, for example, a machine guessing the correct answer a significant percentage of time, or too difficult for humans. In particular, with respect to CAPTCHAs, modern optical character recognition ("OCR") systems are becoming sophisticated enough to solve most image puzzles. Furthermore, the distorted text images used in CAPTCHAs fail to comply with America's With Disability Act ("ADA"). Users who are blind or partially sighted are unable to resolve the images, and, as such, unable to fully use the services. To remedy this problem, CAPTCHAs use Alt-tags, which may be heard by screen reading software. These tags carry the text information displayed in the image. This makes the text information readily available to automated processes—defeating CAPTCHA itself. Therefore, there is a need for a method that overcomes the above-stated problems and at the same time effectively distinguishes between human and automated responses for machine access with use of a human interactive proof or reverse Turing test. In particular, there is a need for a method that allows use of Alt-tags or text without compromising the effectiveness of the test.

SUMMARY

This disclosure defines a method by which automated systems such as, computers, can confirm that a remote user is a human rather than an automation. The method performs this task while requiring minimal user intervention, and the method performs this task in a manner, which does not infringe on the access of the disabled, as such, complying with the ADA.

Illustratively, in one example, a question is presented to the user, asking the user "which of the illustrated objects is not similar to the other." Along with the question a series of objects (e.g., images with ALT tags) is presented to the user. The objects may include pictures of three different houses and a picture of a dog. Because the majority of the objects (e.g., houses) that are presented to the user have at least one common attribute, which is apparent to the human observer and which is absent among the remaining objects (e.g., a dog), a human observer can easily determine the correct answer (e.g., a dog) to the above-stated question. In particular, a human observer can pick up this association without training, whereas an automation is unlikely to be able to pick up such association.

Specifically and according to one general aspect, this disclosure provides a computer-implemented method for distinguishing a live actor from an automation. The method includes a step of receiving, from a user, a request to access a service, and, in response to the request, a step of presenting to the user a minority set of objects of size N and a majority set of objects of size greater than N. N is a natural number and the majority set includes objects sharing at least one common attribute expected to be apparent to a human observer absent among objects associated with the minority set. The method also includes steps of requesting, from the user, to identify at least one object, from among the objects associated with the minority or majority set, that satisfies a predetermined criterion and receiving, from the user, an indication of a selection of at least one object. The method further includes steps of determining whether the user-selected object satisfies the predetermined criterion and determining that the user is a human upon determining that the user-selected object satisfies the predetermined criterion.

Implementations of the above general aspect may include one or more of the following features. For example, the step of requesting, from the user, to identify the at least one object may include requesting, from the user, to identify objects associated with the minority set. Alternatively or additionally, the step of requesting, from the user, to identify the at least one object may requesting, from the user, to identify objects associated with the majority set.

For another example, the step of receiving, from the user, the request to access the service may include receiving a key from the user. The receiving of the key may include receiving a telephone number from the user. The method may further include determining objects associated with the minority and majority sets based on the key.

In one implementation, the step of receiving, from the user, the request to access the service includes receiving, from the user, a request to access a text messaging service. Alternatively or additionally, the step of presenting the minority set includes presenting a minority set including objects associated with images, texts, or sounds, and the step of presenting the majority set includes presenting a majority set including objects associated with images, texts or sounds. Along these lines, the method may further include associating with each of the objects appearing in the minority and majority sets an Alt-tag allowing the object to be audibly described with a screen reader.

The presenting of the majority set may include presenting a majority set including objects that have logical association with one another. The presenting of the majority set may include presenting a majority set of size N+1. Alternatively or additionally, the presenting of the majority set may include presenting a majority set of size of 2N. The presenting of the minority set may include presenting a minority set including objects that fail to have logical association with the objects appearing in the majority set.

In another implementation, the step of receiving request includes receiving request through a network and from a user terminal operated by the user. In this scenario, each of the objects appearing in the minority and majority sets includes a metadata associated with it and the metadata includes a secondary data that is associated with the object and not transmitted to the user terminal. Determining whether the user-selected object satisfies the predetermined criterion may include determining whether the user-selected object includes a predetermined metadata. To further illustrate, determining whether the user-selected object satisfies the predetermined criterion may further include identifying a metadata associated with the user-selected object, comparing the metadata associated with the user-selected object with a predetermined metadata, and based on the result of comparison determining whether the user-selected object satisfies the predetermined condition.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF DRAWINGS

FIG. 3B illustrates an exemplary user interface including series of objects and an associative question presented to a user to ensure the user is human and not an automation.

FIGS. 4A and 4B illustrate exemplary tables that a server uses to determine whether a user-selected object satisfies predetermined criteria.

FIG. 5B illustrates an exemplary user interface showing objects that a server presents to a user to identify whether the user has a particular level of knowledge.

FIG. 6 illustrates a network or host computer platform, as may typically be used to implement a server.

FIG. 7 illustrates a computer with user interface elements, as may be used to implement a personal computer or other type of work station, although computer of FIG. 7 may also act as a server if appropriately programmed.

DETAILED DESCRIPTION

Figure 1:
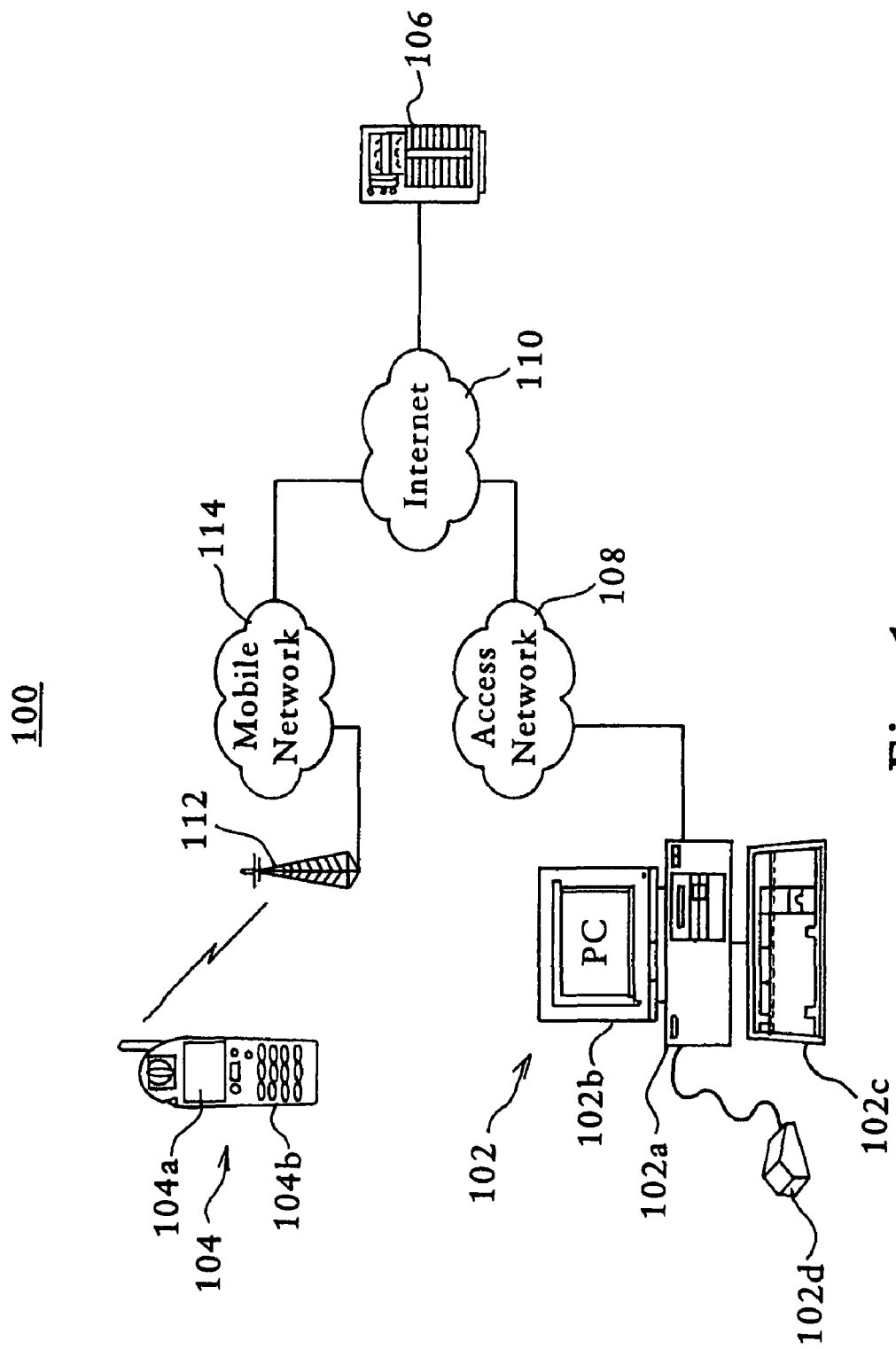
FIG. 1 illustrates a system for providing machine access security by deciding whether an anonymous user is human or machine.

In the following detailed description, numerous specific details are set forth by way of examples in order to provide a thorough understanding of the relevant teachings. However, present teachings may be practiced without such details. In other instances, well known methods, procedures, components, and circuitry have been described at a relatively high-level, without detail, in order to avoid unnecessarily obscuring aspects of the present teachings.

In accordance with techniques described herein, a host computer, wishing to ascertain if a user operating a client device, either local or remote—is being operated by a human or a machine, provides the client device with a series of objects and poses a question to the user via the client device about the objects. The majority of these objects have some sort of association with each other that can be deduced by a human. For example, majority of these objects share at least one common attribute expected to be apparent to a human observer and absent among the remaining objects.

The series of objects may include images, texts, sounds, or other media forms, such as, for example, video clips. Regardless, to ascertain whether the user is a human or a machine, the host asks, in one specific example, the user to identify the objects lacking the particular attribute present among the majority of the objects. In response to the host's question, the user answers the question by for example selecting (e.g., clicking on) the object that the user believes fails to include the particular attribute.

The host determines whether the answer given by the user operating the client device is correct. Namely, the host determines whether the user's answer agrees with the answer stored in its database and associated with the given question for the series of objects. If so, the host concludes that it is dealing with a human. If the answer is not correct, however, the host concludes that it is dealing with a machine or otherwise not dealing with a human. Humans, even at young age, are good with associative skills, whereas computers do not do this well.

To further illustrate, one specific example will be described. In this example, assume that the host computer is configured to allow a user send text messages to other users without necessarily logging into the system. As such, the host computer may wish to ensure that the remote user accessing this service is indeed a human acting in a deliberate manner and not an automated message "spamming." To this end, the host computer, presents the actor, human or otherwise, with a series of images.

The majority of these images are related in some manner. The remaining images fail to match or relate to the images appearing among the majority set. As an example, a set of pictures might have cars of various colors. In addition, a few additional images might be of various fruit types. Since the majority of the objects are cars, and relatively few of the objects are fruits, one may safely assume that the actor is human. An automation, however, does not have enough computer power to resolve the issue of association. Specifically, while it may be possible to build a large computer which might be able to compute the association, the cost will be high, and the average software-infected PC lack the necessary processing power.

Reference is now made in detail to the examples illustrated in the accompanying drawings and discussed below. FIG. 1 illustrates a system 100 for providing machine access security by deciding whether an anonymous user is a human or a machine. The system 100 is described below with reference to other illustrative figures.

The system 100 includes a personal computer ("PC") 102 and a cellular telephone handset 104 having access to a server 106 through various communication channels. In particular, the system 100 includes PC 102 having access to server 106 through an access network 108 and Internet 110. And, the system 100 includes cellular telephone handset 104 having access to server 106 through a base station 112, a mobile network 114, and Internet 110. The system 100 includes a personal computer ("PC") 102 and a cellular telephone handset 104 having access to a server 106 through various communication channels. In particular, the system 100 includes PC 102 having access to server 106 through an access network 108 and Internet 110. And, the system 100 includes cellular telephone handset 104 having access to server 106 through a base station 112, a mobile network 114, and Internet 110.

The system 100 utilizes a client-server paradigm. Essentially, server 106 provides selected information to users of client devices (e.g., PC 102 and cellular telephone handset 104). A client device may include a terminal or another user device capable of data communication with server 106, which has capabilities allowing display of series of objects (e.g. images) and user selection of the displayed objects. Two common examples are shown in the drawing. As noted above, the first example of a suitable client device is PC 102. Although in FIG. 1 PC 102 is shown to be a desktop unit, it is understood that it can be a laptop or handheld unit. Regardless, PC 102 includes a processing unit 102a, a monitor 102b, a keyboard 102c, and a mouse 102d. The monitor 102b is used for displaying information to the user. The keyboard 102c is used for inputting information into PC 102. The mouse 102d is used for purposes of cursor control/selection.

Those skilled in the art will recognize that PC 102 may offer other user input devices in addition or in place of keyboard 102c or mouse 102d, such as other cursor control and selection devices (e.g. joysticks, trackballs, touchpads, etc.) or speech responsive control. Some such devices, particularly handheld units, also offer touch screen input capabilities.

The second illustrated example of a client device shown is a wireless terminal device, such as a web enabled digital cellular telephone handset 104. The handset 104 includes a display 104a for presentation of information to the user and a keyboard 104b or the like for user input of data and user selections. The handset 104 may also offer cursor control and selection type user input capabilities that allow a user to point-and-click on a displayed object, much like the capability offered with the display and mouse 102d of PC 102.

The server 106 is connected for packet switched data communications via the public network now commonly known as Internet 110. The link of server 106 to Internet 110 may utilize any convenient fiber, wire or wireless transport technology providing sufficient data communication bandwidth to support the expected traffic from users of various client devices (e.g., PC 102 and handset 104).

The PC 102 communicates with server 106 through access network 108 and Internet 110. Access network 108 may include dial-up access networks, digital subscriber line ("DSL") networks, cable modem networks, local or wide area private networks, wireless hotspots, etc.

The handset 104 communicates with server 106 by first communicating over air with base station 112 and then communicating through mobile network 114 and Internet 110. The mobile service providers offer such access via a number of different technologies, some of which provide narrowband data service and some of which now offer broadband mobile data service.

Moving forward, a user of either PC 102 or handset 104 surfs the web to reach the website offered by server 106. The server 106 may offer variety of different web sites/services. The variety of web sites/services may include sites/services associated with banking, electronic mails, and online auction transactions.

Figure 2:
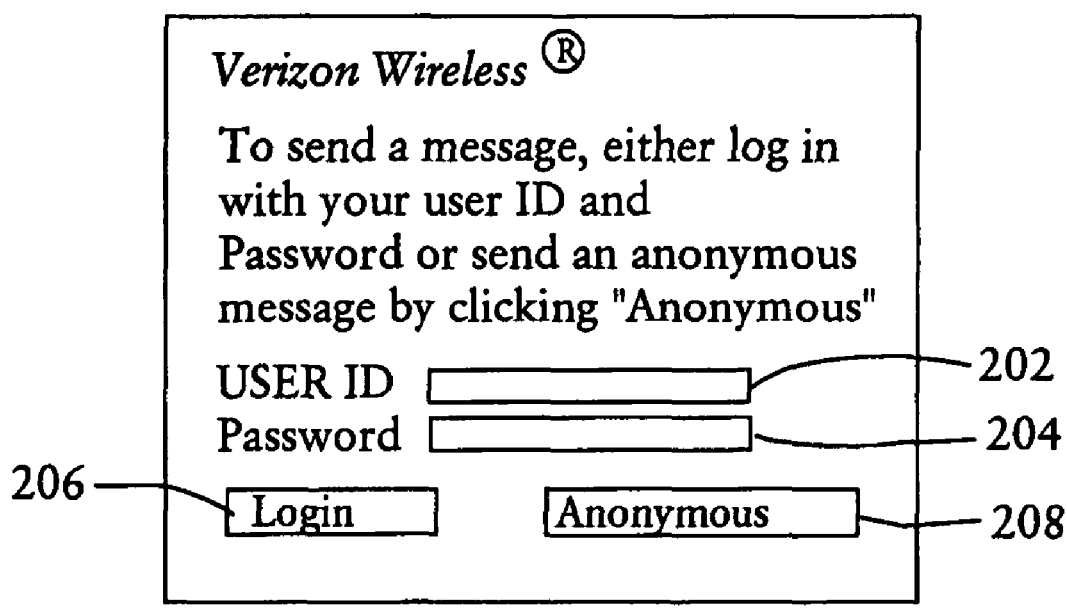
FIG. 2 illustrates an exemplary website that is offered by one or more servers.

In one specific example, as illustrated by FIG. 2, the website offered by server 106 provides text messaging services. To this end, the website requests, from the operator of the client device (e.g., PC 102 or handset 104), to either log into server 106 or to send an anonymous message.

If the user decides to log into server 106, the user is asked to provide authentication information. To do so, the user operates the client device to input authentication information, which the client device communicates to server 106. The server 106 includes a login server, which is configured to receive the authentication information from the user of the client device (e.g., PC 102) and to authorize access by user to the text messaging services offered by server 106. For example, server 106 authorizes the user of PC 102 to send a text message to a user of handset 104.

In contrast, if the user of PC 102 decides to send an anonymous message, server 106 may wish to ensure that the user is indeed a human acting in a deliberate manner rather than a machine intending to spam other users (e.g., user of handset 104). To this end, server 106 includes a method, illustrated by FIG. 3, for determining whether a user is a human or a machine. If server 106 determines the user of PC 102 is human, server 106 allows the user to send an anonymous message to other users (e.g., a user of handset 104). However, if server 106 determines that the user of PC 102 is a machine or otherwise not a human, server 106 does not allow the user to send a text message to other users (e.g., a user of handset 104). To appreciate these operations, it may be helpful to consider an example, with respect to FIGS. 2-4.

FIG. 2 illustrates an exemplary website 200 that is offered by one or more servers. In keeping with the previous examples and for convenience, particular components described with respect to FIG. 1 are referenced in describing the website 200. More particularly, web site 200 is hosted by server 106 and offers text messaging services to the user (e.g., the user of PC 102).

In keeping with the previous example, website 200 enables the user operating PC 102 to send a message to other mobile users (e.g., a user of handset 104) with or without logging into server 106. To this end, website 200 includes a user identification text box 202, a password text box 204, a login icon 206, and an anonymous icon 208.

To log into server 106, the user enters a user ID and password in user identification text box 202 and password text box 204, respectively. In one example, the user ID includes a telephone number of the user. In another example, the user ID includes an e-mail address of the user. In yet another example, the user ID includes a series of characters (e.g., text and/or numbers) not associated with particular number or an e-mail address. The password represents the user's assigned authentication symbol and is associated with the user ID.

After entering the user ID and password, the user selects (e.g., clicks on) user login icon 206 to log into server 106. Selecting login icon 206 submits the user's credentials (e.g., user ID and password) to server 106, which compares the user ID and password against the user ID and password stored in a database.

If the user-provided credentials (e.g., user ID and password) match the one stored in the database, server 106 logs the user into the system and informs the user of the same. Otherwise, server 106 informs the user that the submitted credentials (e.g., user ID and password) are not correct and requests the user to try again or simply send an anonymous message. In one implementation, after an unsuccessful login attempts, server 106 prevents further login attempt until a particular reset action is performed.

The user may send an anonymous message by selecting anonymous icon 208. Before allowing the user to send an anonymous text message to other users, however, server 106 may wish to ensure that the user operating the client device (e.g., PC 102) is indeed human acting in a deliberate manner and not a machine attempting to spam other users. To do so, server 106 uses an exemplary method 300A illustrated in FIG. 3A.

Figure 3A:
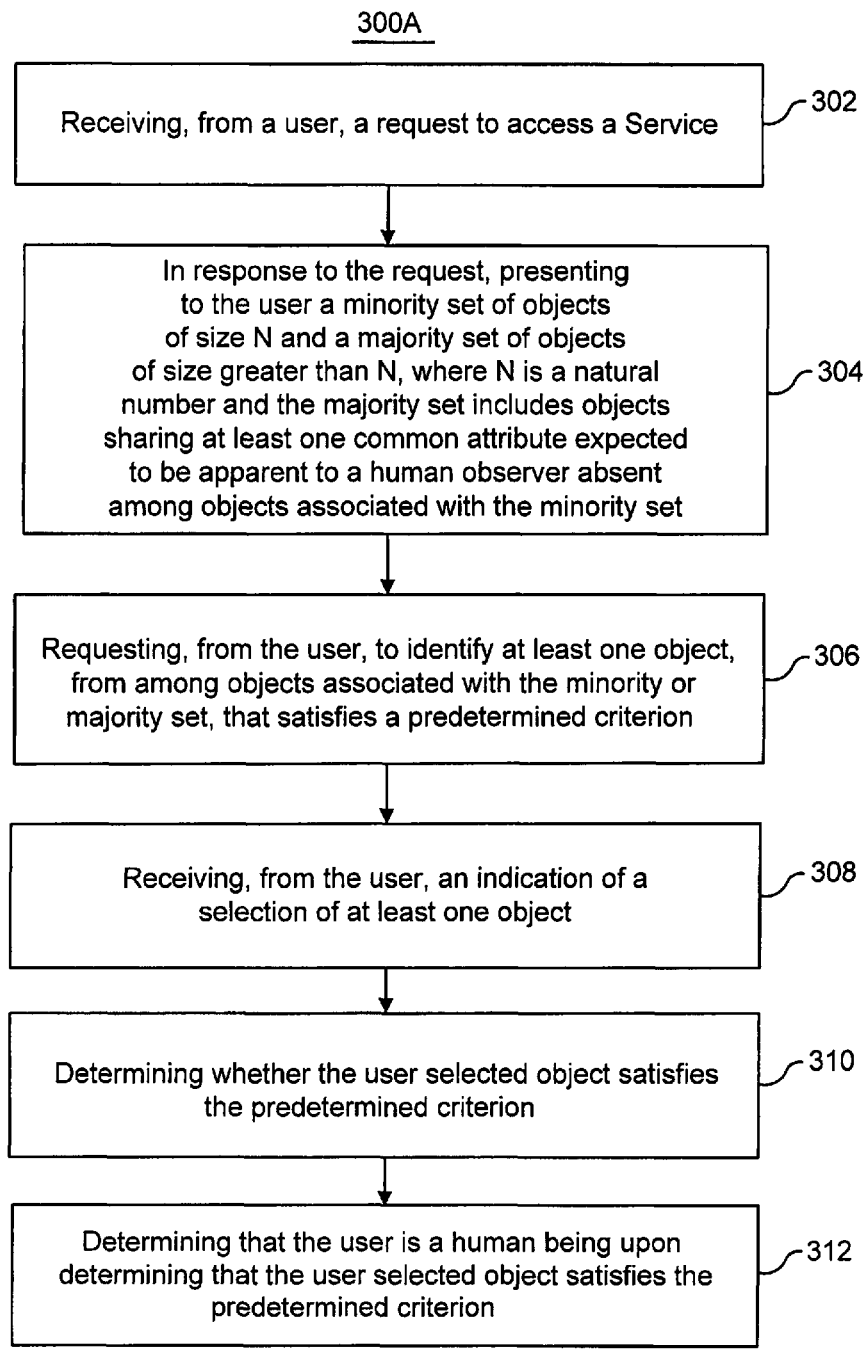
FIG. 3A illustrates an exemplary process used for determining whether a user of a given client device is human or machine.

FIG. 3A illustrates an exemplary process 300A used for determining whether a user of a given client device is human or machine. In keeping with the previous examples and for convenience, particular components described with respect to FIG. 1 are referenced as performing process 300A. More particularly, process 300A involves, among other components, PC 102, handset 104, and server 106. It should be noted that the components that are referred to as performing process 300A are for illustrative purposes only. In some implementations, other components, or a different combination of components within a system, may instead perform process 300A.

The process 300A includes server 106 receiving, from a user, a request to access a service (302). In keeping with the previous example, the user may be a user of PC 102 wishing to use the text messaging services offered by server 106 to send a text message to other users (e.g., handset 104). To illustrate, in one example, the user operating PC 102 accesses the website offered by server 106. To do so, the user enters a URL of the website in the address field of a browser application. As a result, PC 102 displays the website to the user. The website may include a user interface, such as, a user interface illustrated by FIG. 2.

To allow the user to send a text message, server 106 may request that the user first logs into the system with a user ID and password. Alternatively or additionally, server 106 may allow the user to send an anonymous message without necessarily requiring the user to log into the system. In either case, assuming that the user successfully reaches the text messaging application on server 106, the user is allowed to send a text message to other users (e.g., handset 104).

If the user selects to send an anonymous text message (e.g., by clicking on anonymous icon 208), server 106 may choose to determine whether the user is indeed a human acting in an intended manner and not an automation, which could flood the website with unsolicited requests.

To do so, in one implementation, server 106 presents to the user a minority set of objects of size N and a majority set of objects of size greater than N, where N is a natural number and the majority set of objects share at least one common attribute absent among objects associated with the minority set (304). The presenting of the majority set includes presenting a series of objects that have logical association with each other. And, the presenting of the minority set includes presenting objects that fail to have logical association with the objects appearing in the majority set.

The objects appearing in majority or minority sets may include images, texts, and/or sounds. Each of the objects in the minority and majority sets may include an Alt-tag associated therewith allowing the object to be audibly described with a screen reader.

To further illustrate, FIG. 3B shows an exemplary user interface 300B including series of objects and an associative question presented to the user to ensure the user is a human and not an automation. As shown, the majority set of objects includes residences of different size. The residences include a residence 314 (e.g., a mansion), a residence 316 (e.g., a home), and a residence 318 (e.g., a house). Although, the visual representations of the various residences differ from one another, they all share one common attribute that is apparent to a human observer. Namely, they each include an image of a building.

The user interface 300B also shows a human image 320. The human image 320 is associated with the minority set of objects presented in the user interface 300B because it fails to share the common attribute appearing among the objects in the majority set. As shown, each of the objects in the minority and majority sets includes an Alt-tag. For example, residence 314 includes an Alt-tag mansion, residence 316 includes an Alt-tag home, residence 318 includes an Alt-tag house, and human image 320 includes an Alt-tag human. The Alt-tags allow the objects to be audibly described, to enable users having eye impairment identify presented objects and the presence or absence of a logical association between them.

After presenting the objects and the question to the user, server 106 may request, from the user, to identify at least one object, from among objects associated with the minority or majority set, that satisfies a predetermined criterion (306). In one example, server 106 requests, from the user, to identify objects associated with the majority set. In another example, server 106 requests, from the user, to identify objects associated with the minority set.

To further illustrate and in keeping with the example described with respect to FIG. 3B, server 106 requests that the user identifies the object that is not like the others in the user interface 300B. In response, the user selects (e.g., clicks on) the human image 320. The server 106 receives, from the user, an indication of a selection of at least one object (308) and determines whether the user-selected object satisfies the predetermined criteria (310). To do so, in one implementation, server 106 uses one or more tables defining the predetermined criteria for each question.

FIGS. 4A and 4B illustrate exemplary tables 400A and 400B, respectively, that server 106 uses to determine whether the user-selected object satisfies the predetermined criteria. The exemplary table 400A includes list of objects that are presented to the user and their associative details. In particular, table 400A includes an image column 402A, an Alt-tag column 404A, and a metadata column 406A.

The image column 402A defines images associated with each of the objects. As shown, the image column 402A includes an image of a mansion, a house, a home, and a human, each of which is shown in the user interface 300B. The Alt-tag column 404A defines an Alt-tag associated with each of the objects. As shown, the Alt-tag column 404A includes a mansion, a house, a home, a human, explaining to the user who is blind or partially sighted the objects being displayed in the user interface 300B.

The table 400A also includes the metadata column 406A. The metadata column 406A includes a metadata associated with each of the objects. In one implementation, the metadata includes a secondary attribute/data that is associated with the object and that is not transmitted, from server 106, to the user terminal (e.g., PC 102). The server 106 may use the metadata to determine whether a give user passes a test—that is in order for server 106 identify the user of the client device as a human rather than a machine, as described below in more detail with respect to FIG. 4B.

FIG. 4B illustrates an exemplary table 400B including plurality of questions and their matching attributes. To this end, table 400B includes a question column 402B, a metadata column 404B, and a user-selected object metadata column 406B. The question column 402B defines one or more questions that may be asked from the user. For instance, the question column 402B includes questions such as "which one of these things are not like the others?" or "which of the following items are similar to each other?."

The metadata column 404B includes a metadata associated with each question for a set of objects presented to the user. Based on the set of objects presented to the user, a programmer completes the cells appearing in metadata column 404B. For example, assuming that the objects in table 400A are presented to the user, programmer completes the cells in column 404B as follows. In response to "which one of these things is not like the others?," the programmer places the metadata person in cell 410B, and in response to "which of the following items are similar to each other?," the programmer enters the metadata (1) "residence-large size," (2) "residence-medium size," and (3) "residence-small size," in the cell 412B.

As noted above, the metadata appearing in the metadata column 404B depends on a set of objects and questions being presented to the user. For example, the metadata appearing in the metadata column 404B changes if objects other than those shown in the user interface 300B are presented to the user. Similarly, if the question presented to the user changes, the metadata appearing in the metadata column 404B also may change.

Regardless and moving forward, table 400B also includes the user-selected object metadata column 406B. The user-selected object metadata column 406 includes a metadata of the user-selected object in response to the presented question.

In one implementation, to determine whether the user-selected object satisfies the predetermined criterion (310), server 106 identifies a metadata associated with the user-selected object, compares the metadata associated with the user-selected object with a predetermined metadata, and based on the result of comparison makes a determination whether the user-selected object satisfies the predetermined criterion.

In keeping with the example shown in the user interface 300B, if the user selects the human image 320 as an answer to the question "which one of the following is not like the others?", server 106 references the internal table 400A to determine the metadata associated with the human image 320. In this manner, server 106 determines that the metadata associated with the human image 320 is "person." Accordingly, server 106 places metadata "person" in cell 408B. Then, server 106 compares the metadata in cell 408B with the predetermined metadata in cell 410B and since they match server 106 concludes that the user of the terminal (e.g., PC 102) is indeed a human.

In a slightly different scenario, where the user selects, for example, a mansion image 314 in response to the same question, server 106 references the internal table 400A to determine the metadata associated with the mansion image 314. In this manner, server 106 determines that the metadata associated with the mansion image 314 is "residence-large size." Accordingly, server 106 places metadata "residence-large size" in cell 408B. Then, server 106 compares the metadata in cell 408B with the predetermined metadata in cell 410B and since they fail to match, server 106 concludes that the user of the terminal (e.g., PC 102) is not human.

In yet another implementation, where the question presented to the user is "which of the following are similar to each other?," user selects, for example, the mansion image 314, the home image 316, and the house image 318. For each of the user-selected objects, server 106 references the internal table 400A to determine the metadata associated with them. In this manner, server 106 identifies metadata (1) "residence-large size," (2) "residence-medium size," and (3) "residence-small size." Accordingly, server 106 places these metadata in cell 414B. Then, server 106 compares the metadata in cell 414B with the predetermined metadata in cell 412B and since they match, server 106 concludes that the user of the terminal (e.g., PC 102) is a human.

Of course in all of these scenarios, server 106 can merely compare the metadata associated with the user-selected object with the predetermined metadata in table 400B without necessarily storing the metadata associated with the user-selected object in table 400B. That is, in one implementation, server 106 references table 400A, identifies the metadata associated with the user-selected object and compares it with a predetermined metadata stored in table 400B without storing the metadata associated with the user-selected object in table 400B. In either case, using process 300A, server 106 verifies whether or not the user is human. The process 300A relies on a concept of whether a given user can glean a correct answer based on a context associated with a set of objects presented to the user. Because the answers are deduced based on context, there is nothing for a machine learning systems to memorize and respond to. As such, the automations are likely to fail the test presented by process 300A.

Furthermore, since the objects presented to the user are not limited to images (or if they are, they can be presented with Alt-tags), the system implementing process 300A can comply with ADA 1992 act and yet maintain a high-anti-automation prevention level. This is because ALT-Tags, though they are text which is readily located by screen reading software and automation alike, do not convey sufficient context information to allow automations to infer an association. To illustrate, referring again to FIGS. 3A and 3B, it is noted that each of the majority objects is some type of dwelling (e.g., a House, a Home, a Mansion). The minority set, however, includes one object—a human face.

Though all objects carry alt-tags which indicate their type (Mansion, Home, Human, House) and a screen reader may announce (a) "Mansion," (b) "Home," (c) "Human," and (d) "House," no automation will infer the association to eliminate option (c)—the human face. Yet, the tags may be clear and concise and may allow common screen reading software for the blind and partially sighted to function correctly, allowing full use of the site and providing compliance with ADA1992. Existing reverse Turing tests such as CAPTCHAs fail in this regard. As noted previously, providing alt-tags to a standard CAPTCHA allows screen readers to function, but, it also provides the answer to automations, which defeats the CAPTCHA itself—along with the security it was intended to provide. Other implementation are contemplated.

Figure 5A:
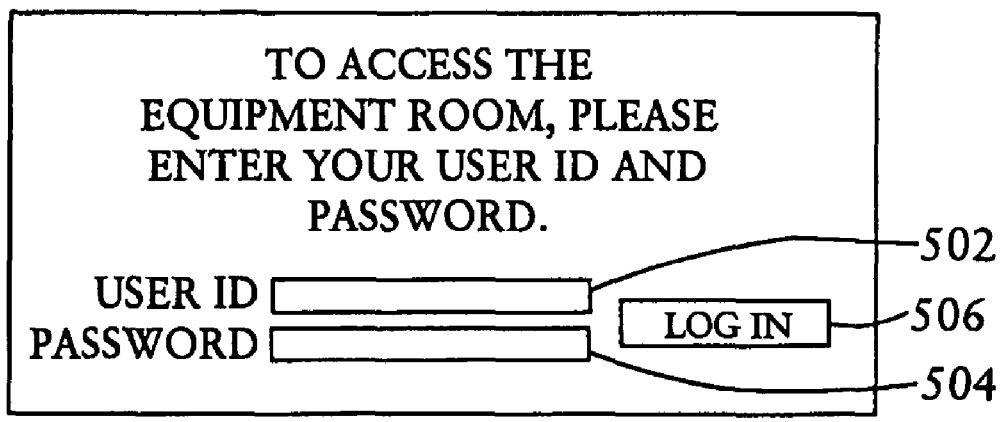
FIG. 5A illustrates an exemplary user interface presented to a user wishing to access an equipment room.

For example, the system implementing process 300A may be modified to test not only for whether or not a user is human but also for whether he or she posses a particular level of knowledge/competency. FIGS. 5A and 5B illustrate an example of such a scenario. In particular, FIGS. 5A and 5B show one way the system, for example, determines whether the user is a technician having a particular level of knowledge about his daily work.

FIG. 5A illustrates an exemplary user interface 500A presented to a user wishing to access the equipment room. The user interface 500A includes a user identification text box 502, a password text box 504, and a login icon 506.

To login, the user enters a user ID and password in user identification text box 502 and password text box 504, respectively. The user ID may include an enterprise issued ID number and the password may represent the user's assigned authentication symbol associated with the user ID.

The user enters the user ID and password and selects (e.g., clicks on) login icon 506 to log into the server. Selecting login icon 506 submits the user's credentials (e.g., user ID and password) to the server, which compares the user ID and password against the user ID and password stored in a database.

If the user-provided credentials (e.g., user ID and password) match the one stored in the database, the server may use the user ID to look up a question specifically for this technician. Assuming this technician only is supposed to work with Cisco® equipments, the server presents to the user several objects one of which includes a Cisco® equipment and requests, from the user, to identify the equipment with which the user works.

FIG. 5B illustrates an exemplary user interface 500B showing the objects that the server presents to the user to identify whether the user has a particular level of knowledge. The user interface 500B shows to the user several pieces of equipment the user may or may not wok with as part of technician's job and requests that the user selects the equipment with which the user works.

The objects include Wi-Fi™ Zone, Cisco® books and a blender. As shown, each of the objects includes an associated Alt-tag describing the object. The server already knows through the attributes that the technician is only supposed to check Cisco® metadata-tagged images. If the user selects the correct object (e.g., Cisco® books), the server verifies that the user is indeed human and a technician having a particular level of knowledge. If, however, the user selects an incorrect object, the server determines that the user is not a technician with a particular knowledge. For example, the server may conclude that the user is a thief who has stolen the user ID and password of the technician. Alternatively or additionally, the server may conclude that the user is simply an automation. Alternatively or additionally, the server may conclude the user is indeed a technician but not ready to perform his duties today.

Along these lines, to identify a particular level of knowledge each person may have different set of questions associated with him or her. For example, a different technician would have a different data in a database and thus different images and attributes qualifications.

The algorithms/concepts described thus far can be used to determine not only whether the user is human but also whether the user posses a particular level of knowledge. FIG. 1 illustrates a typical example of how a user operating PC 102 and wishing to send a text message to another user (e.g., the user of handset 104) interacts with server 106. However, it should be noted that other implementations are possible without deviating from the concepts described in this application.

For example, the concepts described in this application applies equally to a user operating handset 104 (e.g., a PDA or a Blackberry) and wishing to send a text message to the user operating PC 102. As such, the user operating handset 104 may interact with server 106 in the same manner as the user operating PC 102. Alternatively or additionally, the user operating handset 104 (e.g., a PDA or a Blackberry) may wish to send a text message to other handsets (not shown) operating users. In this scenario, the user is still presented with the same user interfaces. For another example, although server 106 is shown to be reachable across the Internet, it should be understood that server 106 may be implemented in any of the networks shown. For example, server 106 may be included in access network 108, the Internet 110, and/or mobile network 114. Additionally or alternatively, server 106 may be placed in the terminal itself. To illustrate, server 106 may be part of a stand alone terminal used for authentication. In one example, the stand alone terminal may be a terminal placed at a particular building such as an ATM machine or a vending machine without a connection to a wired or a wireless network.

In another example, objects presented to the user may be created on the fly. To do so, in one example, the server simply references a database having many objects some of which share at least one common attribute and identifies via using one or more filters a majority set of objects and a minority set of objects. In one example, the minority set of objects includes size of N and the majority set of objects includes size of greater than N (e.g., 2N or N+1).

Of course depending on a particular filter used different objects may be identified for the majority and minority sets. In one example, the server uses a first filter configured to a minority set of objects (e.g., objects that are not car). Assuming N is equal to one, the server, using the first filter, identifies a book from among the objects within the database. Along these lines, the server uses a second filter to identify a majority set of objects. The second filter may be configured to identify cars from among the objects within the database. Assuming that the size of the majority set is 2N, the server identifies two cars from among the objects in the database and presents them to the user.

When the user attempts to access the network, the server presents to the user the majority set of objects (e.g., cars) and the minority set of objects (e.g., a book) and requests from the user to identify the object that fails to have a logical association with the others. If the user selects the objects which are associated with the minority set (e.g., the book), the server assumes that the user is human as the automation is unable to perform this task. However, if the user fails to select the right object, the server does not have enough information to conclude whether the actor is human. As such, the server may terminate the session or request the user to try again. In doing so, the server may present to the user different objects until the actor passes the test.

As shown by the above discussion, many of the functions relating to the distinguishing the human user from an automation are implemented on computer connected for data communication via the components a network. The relevant functions may be performed in a server such as server 106 shown in FIG. 1 implementing the programs as discussed above relative to the other drawings. The server 106, for example, may be implemented using one or more hardware platforms intended to represent a general class of data processing device commonly used to run "server" programming so as to implement the functions discussed above, albeit with an appropriate network connection for data communication, via the Internet 110 in the illustrated example. The computer or similar hardware platform could be implemented as a network element, e.g. for providing messaging services to customers of the network service provider.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. objects for the testing. The software code is executable by the general-purpose computer that functions as the server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for distinguishing a live actor from an automation, in essentially the manner performed in the implementations discussed and illustrated herein. As used herein, terms such as computer or machine "readable medium" refer to any storage medium that participates in providing instructions to a processor for execution.

FIGS. 6 and 7 provide functional block diagram illustrations of general purpose computer hardware platforms. FIG. 6 illustrates a network or host computer platform, as may typically be used to implement a server. FIG. 7 depicts a computer with user interface elements, as may be used to implement a personal computer or other type of work station, although computer of FIG. 7 may also act as a server if appropriately programmed.

In the example, server 106 implemented most of the processing functions related to the capacity analysis. The server 106 may be implemented using one or more such hardware platforms intended to represent a general class of data processing device commonly used to run "server" programming so as to implement the functions discussed above. Such a device typically utilizes general purpose computer hardware to perform its respective server processing and to control the attendant communications via the network(s). A server, for example, includes a data communication interface for packet data communication. The server also includes a central processing unit ("CPU"), in the form of one or more processors, for executing program instructions.

The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Those skilled in the art will recognize that the processing of the raw data for the capacity analysis may be implemented on other platforms, such as a PC or the like serving as PC 102 or handset 104. As known in the data processing and communications arts, such a general-purpose computer typically comprises a central processing unit (CPU), an internal communication bus, various types of memory, disk drives or other code and data storage systems, and one or more network interface cards or ports for communication purposes.

The implementation of the computer system for PC 102 and/or handset 104 also includes communications with a display and one or more user input devices such as alphanumeric and other keys of a keyboard, a mouse, a trackball, etc. The display and user input element(s) together form a user interface, for interactive control of the operation of PC 102 and/or handset 104, for example, for obtaining capacity analyses as outlined above. These user interface elements may be locally coupled to the computer system as shown, for example in a workstation configuration of PC 102, or the user interface elements may be remote from the computer and communicate therewith via a network.

Hence, aspects of the methods outlined above may be embodied in software programming, e.g. in the form of program code executable by the server or other programmable device. Such software typically is carried on or otherwise embodied in a medium or media. Terms such as "machine-readable medium" and "computer-readable medium" as used herein generically refer to any tangible medium that participates in providing instructions and/or data to a programmable processor, such as the CPU or other processor of a server computer or user terminal device, for execution or other processing. Such a medium may take many forms, including but not limited to, non-volatile storage media and volatile storage media. Non-volatile storage media include, for example, optical or magnetic disks and flash memory. Volatile storage media include dynamic memory, such as main memory or cache. Hence, common forms of machine-readable storage media include, for example, a floppy disk, a flexible disk, a hard disk, a magnetic tape, any other magnetic medium, a CD or CDROM, a DVD or DVD-ROM, any other optical medium, punch cards, paper tape, any other physical medium with patterns of holes, a RAM, a PROM, an EPROM, an EEPROM, a FLASH-EPROM, a cache memory, or any other memory chip or cartridge.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A computer-implemented method for distinguishing a live actor from an automation, the method comprising steps of:

receiving, from a user, a request to access a service;

in response to the request, audibly presenting to the user a minority set of objects of size N and a majority set of objects of size greater than N, wherein each of the objects appearing in the minority and majority sets is an image or a text that has an alt tag allowing the image or text to be audibly identified, and wherein N is a natural number and the majority set includes objects sharing at least one common attribute expected to be apparent to a human observer and to be absent among objects in the minority set;

requesting the user to identify, based on the audible presentation of objects in the minority set and majority set, at least one object, from among the objects in the minority or majority set, that satisfies a predetermined criterion related to the at least one common attribute;

receiving, from the user, an indication of a selection of at least one object;

determining whether the user-selected object satisfies the predetermined criterion; and determining that the user is a human upon determining that the user-selected object satisfies the predetermined criterion related to the at least one common attribute.

2. The computer-implemented method of claim 1, wherein the step of requesting, from the user, to identify the at least one object includes requesting, from the user, to identify objects in the minority set.

3. The computer-implemented method of claim 1, wherein the step of requesting, from the user, to identify the at least one object includes requesting, from the user, to identify objects in the majority set.

4. The computer-implemented method of claim 1, wherein the step of receiving, from the user, the request to access the service includes receiving a key from the user.

5. The computer-implemented method of claim 4, further comprising determining objects in the minority and majority sets based on the key.

6. The computer-implemented method of claim 4, wherein the receiving of the key includes receiving a telephone number from the user.

7. The computer-implemented method of claim 1, wherein the step of receiving, from the user, the request to access the service includes receiving, from the user, a request to access a text messaging service.

8. The computer-implemented method of claim 1, wherein the Alt tag allows the object to be audibly described with a screen reader.

9. The computer-implemented method of claim 1, wherein the presenting of the majority set includes presenting a majority set including objects that have logical association with one another.

10. The computer-implemented method of claim 9, wherein the presenting of the minority set includes presenting a minority set including objects that fail to have logical association with the objects appearing in the majority set.

11. The computer-implemented method of claim 1, wherein the presenting of the majority set includes presenting a majority set of size N+1.

12. The computer-implemented method of claim 1, wherein the presenting of the majority set includes presenting a majority set of size of 2N.

13. The computer-implemented method of claim 1, wherein the step of receiving request includes receiving request through a network and from a user terminal operated by the user.

14. The computer-implemented method of claim 13, wherein each of the objects appearing in the minority and majority sets includes a metadata associated with it and the metadata includes a secondary data that is associated with the object and not transmitted to the user terminal.

15. The computer-implemented method of claim 14, wherein determining whether the user-selected object satisfies the predetermined criterion includes determining whether the user-selected object includes a predetermined metadata.

16. The computer-implemented method of claim 14, wherein determining whether the user-selected object satisfies the predetermined criterion further includes:
identifying a metadata associated with the user-selected object;
comparing the metadata associated with the user-selected object with a predetermined metadata; and
based on the result of comparison determining whether the user-selected object satisfies the predetermined condition.

17. A host system for distinguishing a live actor from an automation, the host system comprising:
a processing device; and
a memory storing executable instructions for causing the processing device to:
receive, from a user, a request to access a service;
audibly present, in response to the request, to the user a minority set of objects of size N and a majority set of objects of size greater than N, wherein each of the objects appearing in the minority and majority sets is an image or a text that has an alt tag allowing the image or text to be audibly identified, and wherein N is a natural number and the majority set includes objects sharing at least one common attribute expected to be apparent to a human observer and to be absent among objects in the minority set;
request the user to identify, based on the audible presentation of objects in the minority set and majority set, at least one object, from among the objects in the minority or majority set, that satisfies a predetermined criterion related to the at least one common attribute;
receive, from the user, an indication of a selection of at least one object;
determine whether the user-selected object satisfies the predetermined criterion; and
determine that the user is a human upon determining that the user-selected object satisfies the predetermined criterion related to the at least one common attribute.

18. A system for distinguishing a live actor from an automation, the system comprising:
a client system configured submit a request to access a service; and
a host system configured to:
receive, from the client system, the request to access the service;
in response to the request, provide the client system with a minority set of objects of size N and a majority set of objects of size greater than N, wherein each of the objects appearing in the minority and majority sets is an image or a text that has an alt tag allowing the image or text to be audibly identified, and wherein N is a natural number and the majority set includes objects sharing at least one common attribute expected to be apparent to a human observer and to be absent among objects the minority set;
request an operator of the client system to identify, based on an audible presentation of objects in the minority set and majority set, at least one object, from among the objects in the minority or majority set, that satisfies a predetermined criterion related to the at least one common attribute;
receive, from the client system, an indication of a selection of at least one object;
determine whether the selected object satisfies the predetermined criterion; and
determine that the operator is a human upon determining that the selected object satisfies the predetermined criterion related to the at least one common attribute.

19. The system of claim 18, wherein the service includes a text messaging service.

20. The system of claim 18, wherein to provide the client system with the majority set the host system is further configured to provide a majority set including objects that have logical association with one another.

21. The system of claim 20, wherein to provide the client system with the minority set the host system is further configured to provide a minority set including objects that fail to have logical association with the objects appearing in the majority set.

22. The system of claim 18, wherein to provide the client system with the majority set the host system is further configured to provide a majority set of size N+1 or 2N.

23. A computer-implemented method for distinguishing a live actor from an automation, the method comprising:
receiving, from a user terminal and through a network, a request to access a service;

in response to the request, audibly presenting at the user terminal a minority set of objects of size N and a majority set of objects of size greater than N, wherein each of the objects appearing in the minority and majority sets is an image or a text that has an alt tag allowing the image or text to be audibly identified, and wherein N is a natural number and the majority set includes objects sharing at least one common attribute expected to be apparent to a human observer and to be absent among objects in the minority set;

requesting an operator of the user terminal to identify, based on the audible presentation of objects in the minority set and majority set, objects in one of the majority set and the minority set;

receiving, from the user terminal, an indication of a selection of one or more objects;

determining whether the selected one or more objects satisfy a predetermined criterion related to the at least one common attribute; and determining that the operator of the user terminal is a human upon determining that the selected one or more objects satisfy the predetermined criterion related to the at least one common attribute.

24. The computer-implemented method of claim 23, wherein:

the requesting comprises requesting the operator of the user terminal to identify objects in the majority set; and the selection of one or more objects comprises a selection of multiple objects; and the determining that the operator of the user terminal is a human is based upon determining that the selected multiple objects satisfy the predetermined criterion.

25. A computer-implemented method for distinguishing a live actor from an automation, the method comprising steps of:

receiving, from a user, a request to access a service;

in response to the request, presenting to the user a minority set of objects of size N and a majority set of objects of size greater than N, wherein N is a natural number, wherein each of the objects appearing in the minority and majority sets is an image or a text that has an alt tag allowing the image or text to be audibly presented, and wherein the objects in the majority set share at least one common attribute that is expected to be apparent to a human observer, that is absent among objects in the minority set, and that is attributable to each object in the majority set independently of other objects in the majority set;

requesting the user to identify at least one object, from among the objects in the minority or majority set, that satisfies a predetermined criterion related to the at least one common attribute;

receiving, from the user, an indication of a selection of at least one object;

determining whether the user-selected object satisfies the predetermined criterion; and determining that the user is a human upon determining that the user-selected object satisfies the predetermined criterion related to the at least one common attribute.

26. The computer-implemented method of claim 25, wherein the at least one common attribute is selected such that after the at least one common attribute is discerned by the user, which of the majority or minority set of objects a particular object is associated with is able to be determined by the user independent of reference to any other object.

27. The computer-implemented method of claim 1, wherein:

the step of audibly presenting to the user a minority set of objects of size N and a majority set of objects of size greater than N comprises audibly and visually presenting to the user the minority and majority sets of objects; and the step of requesting the user to identify comprises requesting the user to identify, based on the audible and visual presentation of objects in the minority set and majority set, at least one object, from among the objects in the minority or majority sets, that satisfies a predetermined criterion related to the at least one common attribute.

28. The host system of claim 17, wherein:

the function of audibly presenting to the user a minority set of objects of size N and a majority set of objects of size greater than N comprises audibly and visually presenting to the user the minority and majority sets of objects; and the function of requesting the user to identify comprises requesting the user to identify, based on the audible and visual presentation of objects in the minority set and majority set, at least one object, from among the objects in the minority or majority sets, that satisfies a predetermined criterion related to the at least one common attribute.

* * * * *